United States Patent
Kim et al.

(10) Patent No.: US 9,055,451 B2
(45) Date of Patent: Jun. 9, 2015

(54) INDOOR POSITION DETERMINATION METHOD AND SYSTEM BASED ON WLAN SIGNAL STRENGTH

(75) Inventors: Tong Sok Kim, Seoul (KR); Ju Young Du, Seoul (KR); Sung Gwan Kim, Seoul (KR); Choul-Ho Choi, Seoul (KR)

(73) Assignee: KT Corporation, Seongnam (KR)

( * ) Notice: Subject to any disclaimer, the term of this patent is extended or adjusted under 35 U.S.C. 154(b) by 434 days.

(21) Appl. No.: 13/512,532

(22) PCT Filed: Nov. 26, 2010

(86) PCT No.: PCT/KR2010/008460
§ 371 (c)(1),
(2), (4) Date: Sep. 17, 2012

(87) PCT Pub. No.: WO2011/065784
PCT Pub. Date: Jun. 3, 2011

(65) Prior Publication Data
US 2013/0003572 A1    Jan. 3, 2013

(30) Foreign Application Priority Data
Nov. 27, 2009    (KR) .................. 10-2009-0115913

(51) Int. Cl.
*H04W 24/00* (2009.01)
*H04W 64/00* (2009.01)
(Continued)

(52) U.S. Cl.
CPC .............. *H04W 24/00* (2013.01); *H04W 64/00* (2013.01); *H04W 84/12* (2013.01); *G01S 5/0036* (2013.01); *G01S 5/0054* (2013.01); *G01S 5/021* (2013.01); *G01S 5/0252* (2013.01); *G01C 21/206* (2013.01)

(58) Field of Classification Search
CPC ..... H04W 48/20; H04W 64/00; H04W 24/00; G01S 5/0255; H04B 17/0042; H04B 17/0077; H04B 17/0045
USPC ................ 370/260, 311, 331, 332; 455/456.2
See application file for complete search history.

(56) References Cited

U.S. PATENT DOCUMENTS

2005/0261004 A1* 11/2005 Dietrich et al. ............ 455/456.2
2011/0153805 A1*  6/2011 Beninghaus et al. ......... 709/224
(Continued)

FOREIGN PATENT DOCUMENTS

KR    10-2009-0085937 A    8/2009

OTHER PUBLICATIONS

Hyuk Lim et al., "Zero-Configuration, Robust Indoor Localization: Theory and Experimentation", Proceedings IEEE INFOCOM, Apr. 2006, 12 pages.

(Continued)

*Primary Examiner* — Raj Jain
(74) *Attorney, Agent, or Firm* — Sughrue Mion, PLLC

(57) ABSTRACT

An indoor position determination method and system based on WLAN signal strength using remote monitoring and cell space environmental attenuation is provided. The indoor position determination method includes a remote monitoring step of collecting information about signal strength from a neighboring AP and generating an AP signal strength table, a position information requesting step of receiving identification information and signal strength of a detected AP from a mobile terminal, and a cell determination step of comparing a signal strength pattern of each AP received from the mobile terminal with a neighboring AP signal strength pattern of each AP with reference to the AP signal strength table and determining a cell having an AP with a most similar pattern as a cell where the mobile terminal is presently located.

21 Claims, 5 Drawing Sheets

(51) Int. Cl.
*G01S 5/00* (2006.01)
*G01S 5/02* (2010.01)
*H04W 84/12* (2009.01)
*G01C 21/20* (2006.01)

(56) References Cited

U.S. PATENT DOCUMENTS

2011/0309933 A1* 12/2011 Marino .................... 340/539.32
2013/0003572 A1* 1/2013 Kim et al. .................... 370/252

OTHER PUBLICATIONS

Scott Y. Seidel et al., "914 MHz Path Loss Prediction Models for Indoor Wireless Communications in Multifloored Buildings", IEEE Transactions on Antennas and Propagation, Feb. 1992, p. 207-217, vol. 40, No. 2.

International Search Report for PCT/KR2010/008460 dated Aug. 2, 2011, English Translation.

* cited by examiner

| Cell ID | AP installed in Cell | Use |
|---|---|---|
| R001 | AP1, AP2, AP3 | Office Space |
| R002 | AP4, AP5 | Office Space |
| R003 | AP6 | Office Space |
| R004 | AP7 | Office Space |
| Passages1,2,3 | AP8 | Lobby |
| Quter Cell | - | Expression of Outside |

|  | Sending AP | | | | | | |
|---|---|---|---|---|---|---|---|
|  | AP1 | AP2 | AP3 | AP4 | AP5 | AP6 | AP7 |
| Receiving AP(i) AP1 | 10 | 0 | -19 | -22 | -30 | -30 | -12 |
| AP2 | 0 | 10 | -22 | -22 | -30 | -30 | -11 |
| AP3 | -20 | -22 | 10 | 0 | -30 | -50 | -15 |
| AP4 | -22 | -23 | 0 | 10 | -28 | -52 | -10 |
| AP5 | -30 | -31 | -30 | -26 | 10 | -33 | -18 |
| AP6 | -28 | -25 | -30 | -25 | -25 | 10 | -16 |
| AP7 | -10 | -12 | -15 | -13 | -13 | -10 | 10 |

INDOOR POSITION DETERMINATION METHOD AND SYSTEM BASED ON WLAN SIGNAL STRENGTH

CROSS-REFERENCE TO RELATED APPLICATION

This application claims priority under 35 USC 119 (a) to Korean Patent Application No. 10-2009-0115913 filed in the Republic of Korea on Nov. 27, 2009, the entire contents of which are incorporated herein by reference.

TECHNICAL FIELD

The present disclosure relates to an indoor position determination method and system based on WLAN signal strength. More particularly, the present disclosure relates to an indoor position determination method and system based on WLAN signal strength, which divides an indoor space into a plurality of cells based on locations of APs and obstacles such as walls and floors, determines a cell of the indoor space where a mobile terminal is located, if any, and provides the information about the cell.

BACKGROUND ART

A method using a GPS (Global Positioning System) signal emitted from a GPS satellite is one of most widely propagated position determination techniques. However, the method using a GPS signal has its limits since they cannot be used in locations where satellite signals cannot be received such as tunnels and indoors. Therefore, a location determination technique using a WLAN (Wireless Local Area Network) is being developed as a supplementary technique.

A technique has been proposed by Skyhook as one of the position determination methods using a WLAN signal. This technique uses dedicated user terminals to collect information of APs installed all over and then builds a database with MAC addresses and RSSI (Received Signal Strength Indication) values. If a position recognition program of Skyhook is executed at a computer, a coordinate is calculated, and then the coordinate is input to a map, so that the position is displayed on the map. The position-based service of Skyhook has been spotlighted as terminals capable of supporting WLAN connection such as smart phones and notebooks are put into the market. The position information system of Skyhook collects RF fingerprints while moving by using a scanning vehicle. However, since the technique of Skyhook employs a method of measuring AP signals while scanning the mad by using a vehicle, it has a disadvantage of not being able to use indoors.

As another technique, Microsoft has proposed a RADAR method. In the RADAR method, a RF pattern of each point along a passage is collected indoors, and a database is built with the RF pattern so that a position is determined by comparing the collected RF pattern with an RF pattern proposed by a MD of the user. A margin of error is 2 to 3 meters. This technique should satisfy the premise that an accurate position of the AP should be known. For example, 70 points are measured in a 22.5 m×43.5 m mom size, and each point is measured 20 times per AP so that the measurement data is used for providing position information. An interior plan is provided and a wall attenuation coefficient is applied. Different from the technique of Skyhook, the technique of Microsoft may provide indoor position information. However, since reference data for position determination is collected through direct tours and indoors visits, it is inevitable that a large amount of time and costs are needed for such a large-scale service.

The above techniques should collect reference data for position determination through tours and visits to service areas because the service provider is not a communication service provider and so data for AP signals cannot be directly obtained. However, if the service provider is a communication service provider which provides WLAN service, data for AP signals will be obtained more conveniently and economically.

DISCLOSURE

Technical Problem

The present disclosure is designed to solve the problems of the prior art, and therefore it is an object of the present disclosure to provide a method and system, which may remotely collect signal strength information of APs without directly visiting service areas and collecting AP signal information by adding a position determination information collecting function to an element or device in a communication network such as an AP and a network management system in view of a communication network service provider, and provides an indoor position determination service based on WLAN signal strength by using the collected information.

Another object of the present disclosure is to provide a method and system, which may divide an indoor space of a building into cells based on positions of APs and obstacles such as walls and provide position information based on the cells.

Still another object of the present disclosure is to provide a method and system, which may determine information about a cell where a mobile terminal is presently located and then provides information notifying a position in the cell where the mobile terminal is located by means of triangular surveying.

Further another object of the present disclosure is to provide a method and system, which may determine a more accurate position by reflecting an environmental attenuation value only with signal strength information of other APs provided by each AP when the triangular surveying is applied, even though internal space information of a building notifying, for example, a wall interposed between cells is not present.

Technical objects of the present disclosure are not limited to the above, and other technical objects will be apparent to those skilled in the art from the following description.

Technical Solution

In order to accomplish the above object, in one aspect, there is provided an indoor position determination method based on WLAN (Wireless Local Area Network) signal strength, which includes a remote monitoring step of collecting information about signal strength from a neighboring AP (Access Points) and generating an AP signal strength table; a position information requesting step of receiving identification information and signal strength of a detected AP from a mobile terminal; and a cell determination step of comparing a signal strength pattern of each AP received from the mobile terminal with a neighboring AP signal strength pattern of each AP with reference to the AP signal strength table and determining a cell having an AP with a most similar pattern as a cell where the mobile terminal is presently located.

In order to accomplish the above object, in another aspect, there is also provided an indoor position determination system based on WLAN signal strength, which includes a mobile terminal for sending identification information and signal strength of an AP whose signal is detected to a position determination service server to request position information; an AP for sending information about signal strength from a neighboring AP to the position determination service server; a position determination service server for collecting information received from the APs and generating an AP signal strength table, in a case the position information is requested by the mobile terminal, the position determination service server comparing a pattern of signal strength of each AP received from the mobile terminal with a pattern of signal strength of a neighboring AP of each AP with reference to the AP signal strength table, determining a cell having an AP with a most similar pattern as a cell where the mobile terminal is presently located, and sending information about the determined cell to the mobile terminal as position information; a space information storage unit for storing data about a location of an AP and a cell where the AP belongs to; and an AP information storage unit for storing the AP signal strength table.

In order to accomplish the above object, in still another aspect, there is also provided an AP for monitoring signal strength of neighboring APs, which includes an Ethernet interface; a storage unit for storing identification information and signal strength of a neighboring AP; an RF module for storing strength of a WLAN signal received from another AP and identification information of the AP which has sent the signal; and a monitoring client for providing the information stored in the storage unit through the Ethernet interface in a wired manner.

Advantageous Effects

According to the present disclosure, direct tours to service areas are not required for collecting AP signal strength information which is essential to provide WLAN-based position determination service. In addition, since an AP provides the latest signal strength information of neighboring APs, it is possible to always provide position determination service based on a latest status.

BEST MODE

Figure 1:
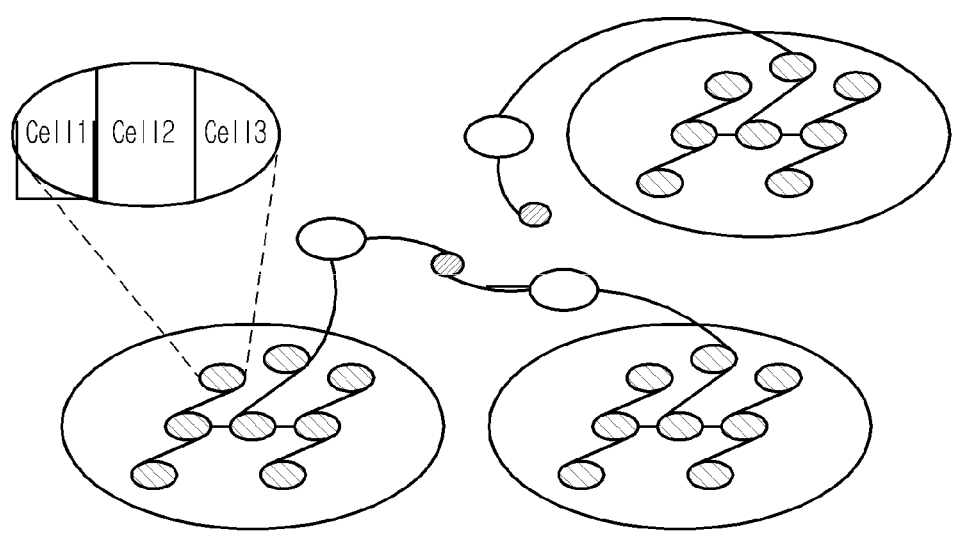
FIG. 1 is a schematic diagram showing a cell space according to an embodiment of the present disclosure.

Advantages and features of the present disclosure and methods for accomplishing the same will be apparent with reference to the following detailed embodiments along with the accompanying drawings. However, the present disclosure is not limited to the following embodiments but may be implemented in various ways. The embodiments are just for perfecting the present disclosure and fully demonstrating the scope of the present disclosure to those having ordinary skill in the art. The present disclosure is defined only by the appended claims. Over the entire specification, the same reference symbol indicates the same component.

Hereinafter, the present disclosure will be described with reference to the drawings such as block diagrams and flowcharts for illustrating an indoor position determination method and system based on WLAN signal strength. At this time, it should be understood that individual blocks of the drawings or their combinations may be performed by computer program instructions. Since these computer program instructions may be loaded on a processor of a general computer, a special-purpose computer or other programmable data processing devices, the instructions performed by a process of a computer or other programmable data processing devices generates the means which performs functions illustrated as blocks of the flowchart. Since these computer program instructions may be stored in a computer-useable or computer-readable memory of a computer or other programmable data processing device in order to implement the functions in a specific manner, the instructions stored in the computer-useable or computer-readable memory may also produce a manufacture item involving an instruction means which performs functions illustrated in the block(s) of the flowchart. Since the computer program instructions may also be loaded on a computer or other programmable data processing devices, a series of operation steps may be performed on a computer or other programmable data processing devices to generate a process executed by a computer so that the instructions of a computer or other programmable data processing devices may provide steps for performing the functions illustrated in block(s) of the flowchart.

In addition, each block may represent a part of a module, segment or code, which includes at least one executable instruction for performing a specific logic function(s). In addition, it should be noted that functions mentioned in blocks may happen in different orders in some alternative examples. For example, two blocks successively illustrated may be performed substantially simultaneously, or the blocks may also be performed in a reverse order according to their functions.

At this time, the term 'module' represents software or a hardware component such as FPGA (Field Programmable Gate Array) or ASIC (Application Specific Integrated Circuit), and the module plays a certain role. However, the meaning of the module is not limited to software or hardware. The module may be configured to be present in an addressable storage medium or to generate at least one processor. Therefore, as an example, the module includes components such as software components, object-oriented components, class components and task components, processes, functions, attributes, procedures, subroutines, segments of a program code, drivers, firmware, microcode, circuits, data, database, data structures, tables, arrays, and variables. Functions provided in components and modules may be combined into a smaller number of components and modules or may be further classified into additional components and modules. Moreover, components and modules may be implemented to regenerate at least one CPU in a device or a security multi-media card.

First, since the WLAN-based position determination method and system according to the present disclosure has a premise that a service area is divided into cells, the cell division reference and concept will be described first.

As a method for applying a signal path loss model without wall and floor information, a cell space model will be applied. An indoor position determination procedure using the cell space model has two-stage processes, including a first stage of checking a cell where a mobile terminal is present and a second stage of calculating an accurate position of the cell.

A free space Cfree may be divided into non-overlapping cells Cr as in Equation 1.

$$C_{free} = \cup_r C_r, \forall i \neq j : C_i \cap C_j = 0 \qquad \text{Equation 1}$$

A neighboring cell is connected by a link, and a main passage is divided into several cells due to its size. No fixed rule is applied to cell division, and the main passage is divided suitably for the purpose. FIG. 1 shows that a building may be divided into cells, each cell may be divided into sub cells, and the cells may be connected by means of edges. A cell space used in an existing GIS (Geographic Information System) is in well accordance with RFID (Radio Frequency Identification), and a detailed position may be recognized by subdividing the space into sub cells. In a case where the RFID is applied, a cell has a single position value due to its homogeneous characteristic.

A cell space allowing position determination through a WLAN according to the present disclosure basically conforms to the cell space characteristics and may have a characteristic of the R3 Euclidean space which allows position calculation in the cell.

Figures 2, 3:
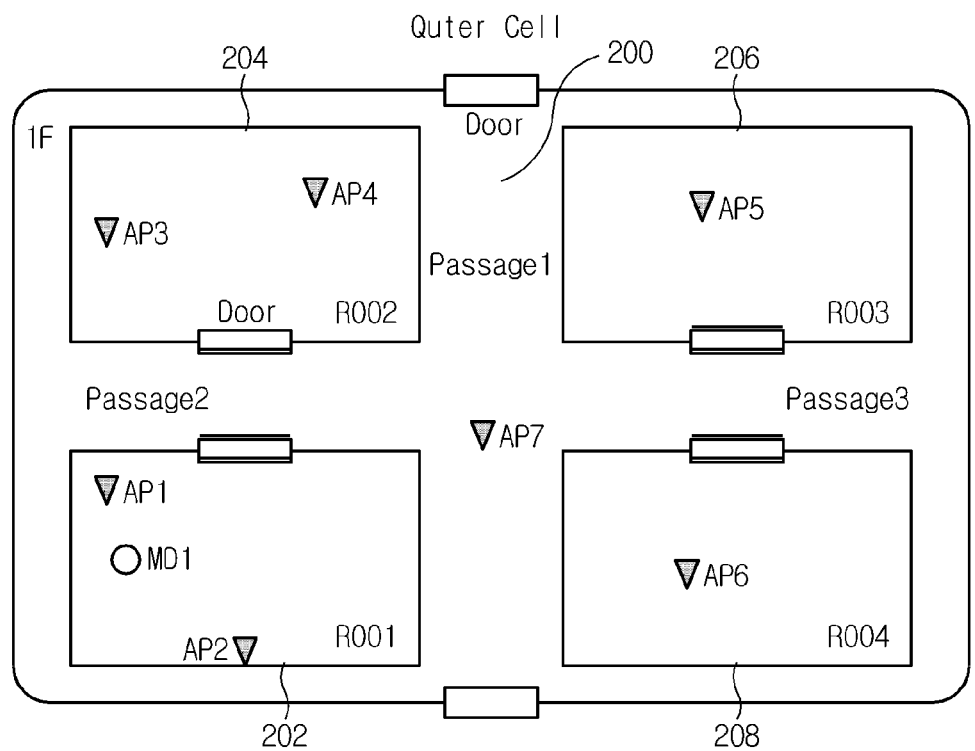
FIG. 2 shows an example of an interior space of a building, which is divided into cells according to an embodiment of the present disclosure.
FIG. 3 is a table showing cell space information according to an embodiment of the present disclosure.

For example, in an indoor space, each floor is composed of passages and moms, and cells may be set based on the space where an AP is installed. FIG. 2 shows an example of a cell space. According to FIG. 2, the indoor space is the first floor, and four large offices are connected through passages. As shown in FIG. 2, the indoor space is composed of five cells 200, 202, 204, 206, 208.

AP1 and AP2 are installed in R001 202. A lobby 200 is connected to Passage2 and Passage3 which are sub cells, and AP7 is installed at the center. Since an environmental attenuation model is used instead of the number of walls among cells, the cells should be divided by walls. The cell may be divided into sub cells, the sub cells are connected through a partition, a temporary wall or a glass door, which have small attenuation, and an AP may not be installed at every sub cell.

The environmental attenuation model will be described later in more detail.

For example, the cell is set based on the space where the AP is installed, and preferably set so that there is no overlapping region among cells.

FIG. 3 shows an example of cell information of the indoor space shown in FIG. 2. Here, an AP installed in a cell based on a cell ID and use of each cell are defined.

Hereinafter, an indoor position determination method based on WLAN signal strength according to an embodiment of the present disclosure will be described.

Figure 4:
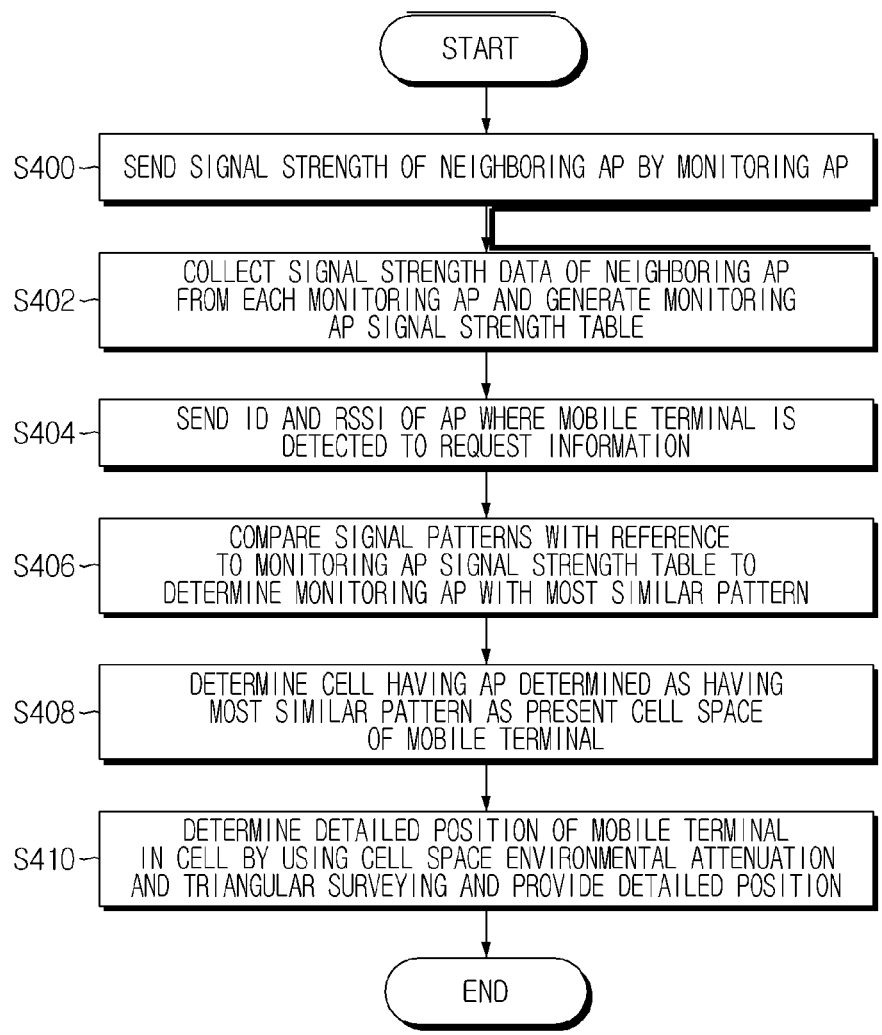
FIG. 4 is a flowchart for illustrating an indoor position determination method based on WLAN signal strength according to an embodiment of the present disclosure.

FIG. 4 is a flowchart for illustrating the indoor position determination method based on WLAN signal strength according to an embodiment of the present disclosure.

Referring to FIG. 4, first, a monitoring AP (Access Point) sends information about signal strength from another monitoring AP to a service server (S400). The monitoring AP may be limited as having the function of sending information about the signal strength.

Hereinafter, the information sending operation of the monitoring AP will be described in more detail.

The position determination service server may send an instruction, requesting information about signal strength from another monitoring AP, to each monitoring AP. As a response to the instruction, the monitoring AP may send a response signal, including the information about signal strength from another monitoring AP, to the device which has transmitted the instruction, namely the position determination service server.

In another embodiment of the present disclosure, the instruction and the response signal may be transmitted based on SNMP (Simple Network Management Protocol). Even though an existing AP also provides an SNMP function, this function has been used extremely limitedly for checking an operation or error. The monitoring AP described in the present disclosure has a message processing function for collecting and providing position determination information by using an SNMP protocol and an AP monitoring function for receiving a signal of another AP and extracting signal strength and MAC information.

The WLAN AP conforms to IEEE 802.11 standards. Therefore, an AP which monitors signal strength of the neighboring AP may include an Ethernet interface, a storage unit for storing identification information and signal strength of the neighboring AP, an RF module for storing the identification information of the neighboring AP, which has sent a WLAN signal, and the strength of the received signal in the storage unit, and a monitoring client for providing the information stored in the storage unit through the Ethernet interface in a wired manner.

The monitoring client support analysis of data based on the SNMP protocol and generation of data, and therefore the signal strength information of each AP stored in the storage unit may be stored in the form of MIB (Management Information Base).

In addition, the monitoring AP may send the information about signal strength to the position determination server under the control of the position determination service server. In another embodiment, even though there is no instruction of the position determination service server, the monitoring AP may periodically send the information about signal strength to the position determination service server.

Hereinafter, the operation of the monitoring client based on the SNMP protocol will be described in more detail.

Figures 5, 6:
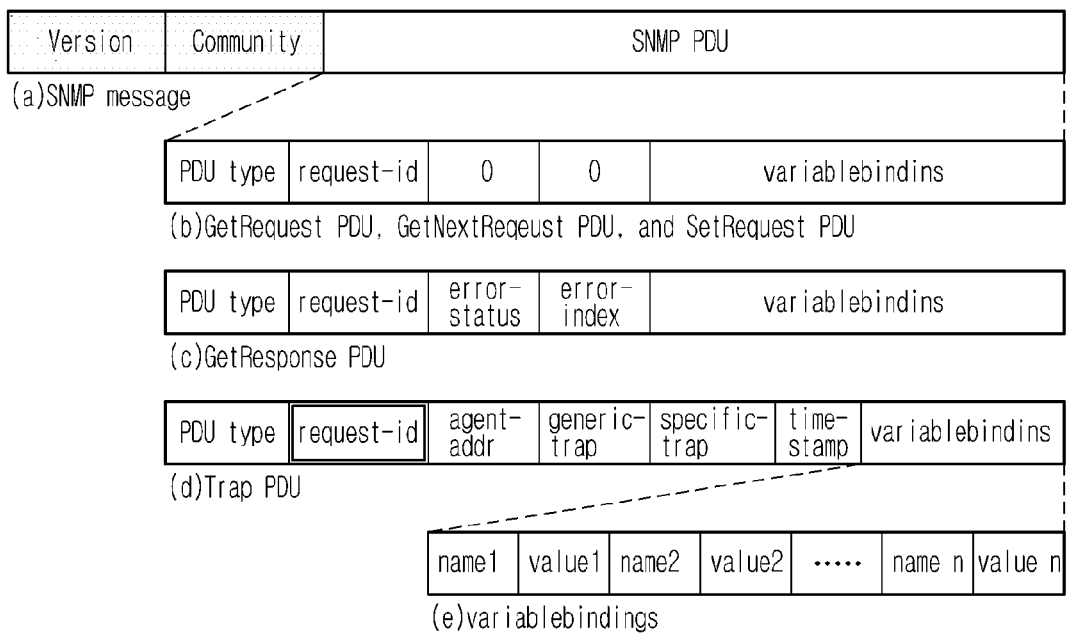
FIG. 5 is a table showing signal strength of monitoring APs according to an embodiment of the present disclosure.
FIG. 6 is a schematic diagram showing SNMP protocol instructions.

FIG. 6 is a schematic diagram showing a structure of an SNMP protocol message.

The communication message between an SNMP manager and an SNMP agent includes GetRequest, GetResponse, GetNextRequest, GetBulk, SetRequest, Trap or the like. The SNMP designates management objects, defined in the MIB, in multi stages as a variable for the message type to exchange single or sequence data. In addition, a level of the output signal of the AP may be controlled by using SetRequest of the SNMP to optimize an indoor coverage, and a present output may be reported by using GetRequest. The output signal strength of the AP is adjusted by using a Set message, and RF profiles of the designated AP, the neighboring AP and the mobile device are collected by using a Get message. Get, GetNext, and Getbulk are defined in Get of the SNMP.

An AP profile management object of the AP is defined in the form of MIB (Management Information Base). The method for defining the MIB refers to related standards. Since the data in the form of MIB has a tree structure, for example, the AP profile may be configured as shown in Table 1 below.

TABLE 1

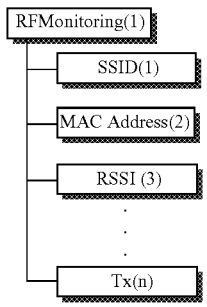

For example, the monitoring AP may manage an AP profile in the form of MIB (Management Information Base) for each of other monitoring APs, and the AP profile may include an identification information, signal strength value of the AP.

Next, the position determination service server collects the information about signal strength from each monitoring AP and generates a monitoring AP signal strength table (S402). The monitoring AP signal strength table may be configured as shown in FIG. 5, for example. The value filled in each field of FIG. 5 may be a signal strength value of a WLAN signal. The unit of the value is dBm, and 0 dBm is 1 mW. For example, AR5112 RF Chip manufactured by Atheros has a maximum output of 21 dBm (±3 dB) and receive sensitivity of −72 dBm incase of IEEE802.11g 54 Mbps. For example, in FIG. 5, if an AP1 receives the output of the AP1, the received output is 10 dBm, and it is displayed that an AP2 receives the signal of the AP1 as 0 dBm. In other words, in some amendments, the monitoring AP may receive the signal output from itself and send the result.

Next, the ID of the AP where the mobile terminal is detected and the signal strength are sent to the position determination service server to request position information (S404).

The position determination service server compares a signal strength pattern of each AP received from the mobile terminal with a signal strength pattern of another monitoring AP with reference to the monitoring AP signal strength table, and determines a cell having an AP with the most similar pattern as a cell where the mobile terminal is presently located (S406). In more detail, in case of arranging APs based on signal strength, the position determination service server may perform the determination based on the fact that the sequence of APs is similar.

For example, assuming that the signal strength of APs measured by the mobile terminal is arranged in a descending order as [A, B, C, D, E, F, G, H] and the signal strength sequence of neighboring APs of the AP1 stored in the monitoring AP signal strength table is [A, D, K, B, C, F, E], the similarity of patterns may be determined according to the following three stages.

In a first stage, APs commonly received by the mobile terminal and the AP1 are searches. As a result, it could be understood that [A, B, C, D, E, F] are commonly included.

In a second stage, the information representing each AP is replaced with a number representing a ranking. As a result, the sequence measured by the mobile terminal is represented as [1, 2, 3, 4, 5, 6], and the sequence stored in the AP1 is represented as [1, 4, 2, 3, 6, 5].

In a third stage, an N number of APs is selected in the former stage, and the difference in the sequence is multiplied by a difference in the RSSI value. The multiplied values are accumulated to calculate a determination reference value. In this example, assuming that the difference in RSSI is 1 for convenience and N is 6, the determination reference value will be '0+2+1+1+1+1=6'.

The first to third stages should be performed for all APs to be monitored according to the location of the mobile terminal to calculate the determination reference value. For example, if the number of APs subject to the monitoring is 4 (AP1, AP2, AP3, AP4), it should be determined which one of the signal strength patterns of AP 1 to AP4 is most similar to the signal strength pattern from each AP sent by the mobile terminal.

An AP subject to monitoring which has the smallest determination reference value will be determined as having the most similar pattern.

According to another embodiment, when calculating the determination reference value, a weight may be endowed according to various conditions.

In a case where an AP subject to monitoring, which has a pattern most similar to the signal strength pattern sent by the mobile terminal, is determined, the position determination service server may determine that the mobile terminal is located in the cell where the determined AP subject to monitoring belongs to, and provide the information of the cell as a present location of the mobile terminal (S408).

In some embodiments, the location of the mobile terminal may be provided more precisely. In other words, the provided information may also notify a specific position in the cell where the mobile terminal is located. In other words, if the data received in the position information requesting step is used, in a case where the mobile terminal detects three or more APs, it is possible to further determine a detailed position of the mobile terminal in the cell, where the mobile terminal is determined as belonging to in the cell determination step, by means of triangular surveying. The triangular surveying is well known in the art as a position determination method, which has not been described in detail.

Hereinafter, operations for providing more detailed position information will be described.

As described above, since each monitoring AP receives its own signal and sends a strength of the signal to the position determination service server, an actual distance between the mobile terminal and the AP which has sent the signal can be calculated by using the strength as a reference value and weighing how much a strength of the signal received by the mobile terminal from the AP is attenuated from the reference value.

This method will be effective only in a space with no obstacle. However, since an interior space of a building has various walls and obstacles, a special calculating method is required. Equation 2 is a general path attenuation model equation.

$$PL = PL(d_0) + 10n \log(d/d_0) + X_\sigma \quad \text{Equation 2}$$

Hereinafter, $d_0$ represents a reference distance for indoor signal measurement and is assumed as 1 m. d represents a distance from a sending side and a receiving side. 'n' is endowed differently depending on the characteristic of the space, and it is known that a hard partition office may be 3.0 and a factory LOS (Line of Sight) environment may be 2.0. $X_\sigma$ represents a Gaussian random variable.

The general path attenuation model equation designates the parameter n according to the structure of a building, without specifically designating a wall or floor.

Meanwhile, an attenuation factor model containing wall attenuation and floor attenuation, which is obtained by generalizing the general path attenuation model equation, is disclosed in "Andersen, J. B., Rappaport, T. S., Yoshida, S., "Propagation Measurements and Models for Wireless Communications Channels", Communications Magazine, IEEE, Volume 33, Issue 1, January 1995 Page: 42-49". Equation 3 is the Attenuation Factor Model equation.

$$PL(d) = PL(d_0) + 10n \times \log\left(\frac{d}{d_0}\right) + w \times WAF + f \times FAF + X_\sigma \quad \text{Equation 3}$$

In Equation 3, PL(d) represents signal strength of an AP which has sent a signal (or, a signal-sending AP) received by the mobile terminal, $PL(d_0)$ represents signal strength of the signal-sending AP, n represents a variable endowed depending on the characteristic of the space, $d_0$ represents a reference distance for signal measurement, d represents a distance from the signal-sending AP to the mobile terminal, w represents a wall hop count from the signal-sending AP to the mobile terminal, WAF represents a wall attenuation coefficient, f represents a floor hop count from the signal-sending AP to the mobile terminal, FAF represents a floor attenuation coefficient, and $X_\sigma$ represents a Gaussian random variable which means a margin of error. The distance d between the signal-sending AP and the mobile terminal may be calculated by using Equation 3.

In other words, when using the triangular surveying, a distance from each signal-sending AP to the mobile terminal may be calculated in consideration of signal attenuation where at least one of the wall hop count and the floor hop count from each signal-sending AP is reflected. At this time, the wall hop count and the floor hop count may be data automatically calculated by a CAD (Computer-Aided Design) program module or a GIS (Geographic Information System), which process blueprint data of the corresponding building.

For example, in a case where distances between the mobile terminal and the AP1, AP2, AP3 are calculated by means of the signal strength of the WLAN signals sent from the AP1, AP2, and AP3, the signal-sending AP may be regarded as meaning the AP1, AP2, and AP3.

Even though the wall hop count and the floor hop count may be automatically calculated as described above, much time and cost are consumed to obtain the space information of the building.

Hereinafter, a method for providing detailed position information without using the wall hop count and the floor hop count will be described.

If a cell where the mobile terminal is presently located is determined, since the mobile terminal is influenced by environmental attenuation caused by walls, floors and partitions, identically to APs installed in the cell where the terminal is presently located, the environmental attenuation L(c) may be defined as in Equation 4 below. L(c) represents a cell space environmental attenuation random variable which is a general term of wireless signal loss factors.

$$L(c) = w \times WAF + f \times FAF + X_\sigma \quad \text{Equation 4}$$

If the environmental attenuation L(c) of Equation 4 is applied to Equation 3, a cell space RSSI path attenuation model equation (Equation 5) according to an embodiment of the present disclosure will be obtained.

$$PL(d) = PL(d_0) + 10n \times \log\left(\frac{d}{d_0}\right) + L(c) \quad \text{Equation 5}$$

The environmental attenuation L(c) of Equation 5 is a value which can be calculated by the position determination service server of this embodiment. Even though an existing method requires detailed building information such as the number of walls and floors for calculation, in this embodiment, the environmental attenuation L(c) is obtained in a simple way since it is a measurement value. An environmental attenuation $L(c_{i,j})$ of a signal path sent from $AP_i$ and received by $AP_j$ is obtained from path attenuation measurement values and calculated distance attenuation as in Equation 6. $d_{i,j}$ represents a distance between the $AP_i$ and the $AP_j$.

$$L(c_{i,j}) = PL(d_{i,j}) - PL(d_0) - 10n \times \log\left(\frac{d_{i,j}}{d_0}\right) \quad \text{Equation 6}$$

Regarding the characteristic of the environmental attenuation, in the same cell space as in Equation 7, an environmental attenuation $L(c_{i,j})$ is 0 according to the homogeneous characteristic of the cell space.

$$L(c_{i,j}) = 0, \text{ if}(c_i = c_j) \quad \text{Equation 7}$$

In Equation 6, $PL(d_{i,j})$ represents strength of a signal sent from the $AP_i$ and received by the $AP_j$, which may be obtained from the AP signal strength table, and $d_{i,j}$ is an actual distance between the $AP_i$ and the $AP_j$, which is a previously stored value. Therefore, if the distance attenuation $10 \cdot n \cdot \log(d_{i,j}/d_0)$ is calculated, the environmental attenuation $L(c_{i,j})$ may be obtained.

In addition, since the environmental attenuation between APs in the same cell space is 0 as defined in Equation 6, if two APs, namely $AP_x$ and $AP_y$, are installed in the same cell, n may be calculated as in Equation 8 below by using a distance d between the $AP_x$ and the $AP_y$ and signal strength between the monitored $AP_x$ and $AP_y$.

$$n = \frac{PL(d) - PL(d_0)}{10 \cdot \log(d/d_0)} \quad \text{Equation 8}$$

The $AP_j$ and the mobile terminal in the same cell space $c_j$ may be defined as having the same environmental attenuation by applying the homogeneous characteristic of the cell space, and accordingly the environmental attenuation $L(c_{i,m})$ of the mobile terminal may be expressed as Equation 9 by applying the environmental attenuation of an AP.

$$L(c_{i,m}) = (c_{i,j}), \{MD_m, AP_j\} \in c_j \quad \text{Equation 9}$$

Here, $L(c_{i,j})$ represents environmental attenuation of a signal path sent by the $AP_i$ and received by the $AP_j$, and $L(c_{i,m})$ represents environmental attenuation of a signal path sent by the $AP_i$ and received by the mobile terminal m.

Distance attenuation $Ld_{i,m}$ of the $AP_i$ and the mobile terminal may be calculated as expressed in Equation 10.

$$Ld_{i,m} = PL(d) - PL(d_0) - L(c_{i,m}) \quad \text{Equation 10}$$

A distance between the mobile terminal and the $AP_i$ may be calculated as expressed in Equation 11 by using the distance attenuation $Ld_{i,m}$ expressed in Equation 10.

$$d_{i,m} = d_0 10^{(Ld_{i,m}/10n)} \quad \text{Equation 11}$$

Since intersecting points of circles $R(d_{i,m})$ where the distance $d_{i,m}$ between the mobile terminal and the $AP_i$ obtained as above is set as a radius and the location of the $AP_i$ that is a sending AP is set as a center may be drawn on an indoor space map, the distance P(m) of the mobile terminal may be estimated.

The location P(m) of the mobile terminal may be provided to the mobile terminal.

Hereinafter, an indoor position determination system based on WLAN signal strength according to another embodiment of the present disclosure will be described.

The indoor position determination system of this embodiment includes a mobile terminal for sending identification information and signal strength of an AP whose signal is detected to the position determination service server to request position information, a monitoring AP for sending information about signal strength from another monitoring AP to the position determination service server, a position determination service server for collecting information received from the monitoring APs and generating a monitoring AP signal strength table, in a case the position information is requested by the mobile terminal, the position determination service server comparing a pattern of signal strength of each AP received from the mobile terminal with a pattern of signal strength of another monitoring AP of each monitoring AP with reference to the AP signal strength table, determining a cell having an AP with a most similar pattern as a cell where the mobile terminal is presently located, and sending information about the determined cell to the mobile terminal as position information, a space information storage unit for storing data about a location of an AP and a cell where the AP belongs to, and an AP monitoring information storage unit for storing the monitoring AP signal strength table.

Figure 7:
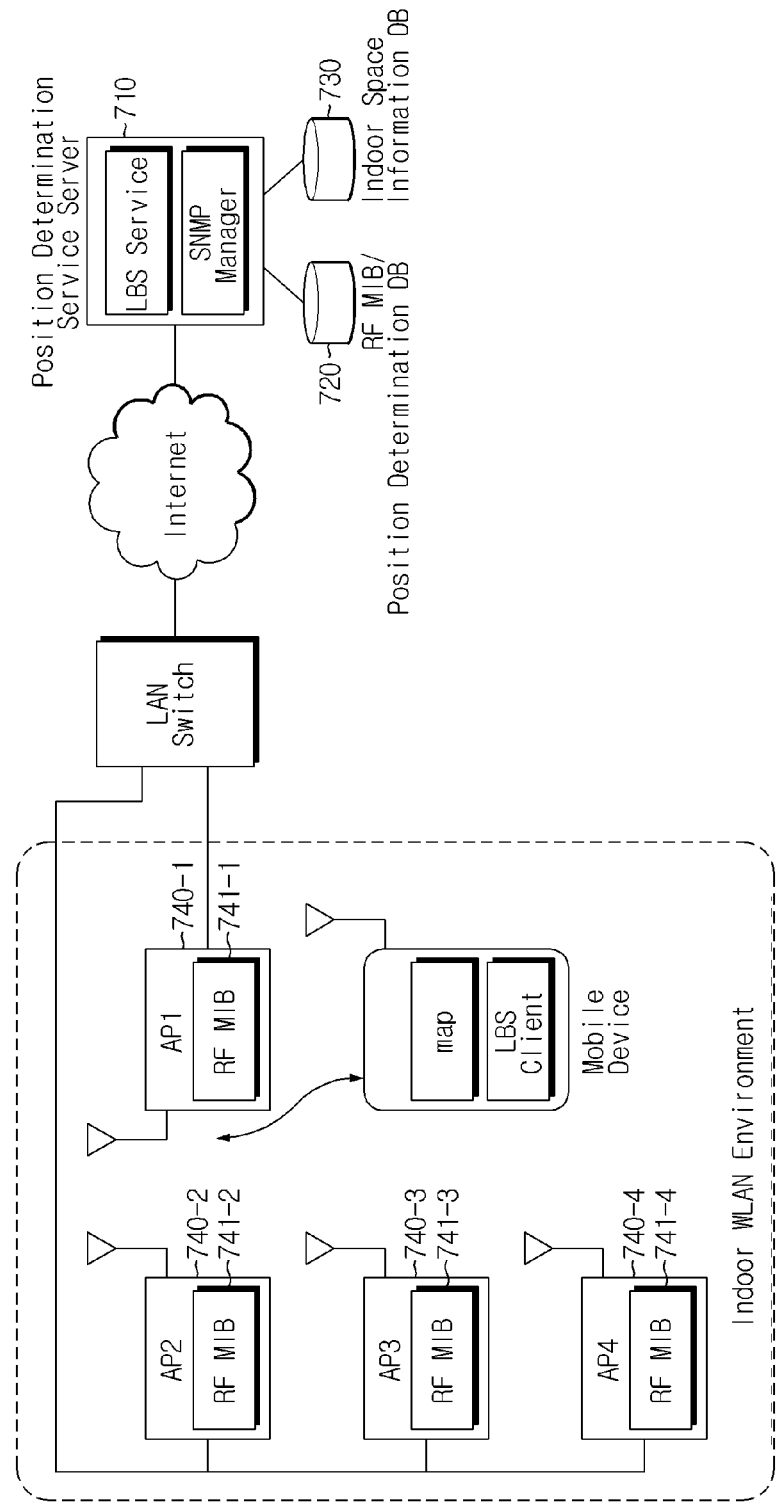
FIG. 7 is a schematic diagram showing an indoor position determination system based on WLAN signal strength according to an embodiment of the present disclosure.

An indoor position determination system according to a modification of this embodiment may be configured as shown in FIG. 7. A position determination service server 710 shown in FIG. 7 may be understood as representing the position determination service server described above, an RF MIB/position determination DB 720 may be understood as representing the AP monitoring information storage unit, and an indoor space information DB 730 may be understood as representing the space information storage unit. In addition, an RF MB (741-*n*) depicted in an AP (740-*n*) may be understood as representing an AP profile in the form of MIB.

Moreover, operations of the indoor position determination system according to this embodiment will be understood from the indoor position determination method described above.

The space information storage unit and the AP monitoring information storage unit may be implemented as at least one of non-volatile memory devices such as a cache, ROM (Read Only Memory), PROM (Programmable ROM), EPROM (Erasable Programmable ROM), EEPROM (Electrically Erasable Programmable ROM) and a flash memory; volatile memory devices such as RAM (Random Access Memory); and storage media such as a hard disk drive, without being limited thereto.

In a case where the mobile terminal detects three or more APs, the position determination service server may further determine a detailed position of the mobile terminal in the cell, where the mobile terminal is determined as belonging to, by means of triangular surveying, and further provide the detailed position information to the mobile terminal.

In addition, when using the triangular surveying, the position determination service server may calculate a distance from each AP to the mobile terminal in consideration of environmental attenuation from each AP to the mobile terminal, and the environmental attenuation from each AP to the mobile terminal may employ environmental attenuation from each AP to an AP installed in the cell where the mobile terminal is located.

A monitoring AP for monitoring signal strength of a neighboring AP according to another embodiment of the present disclosure will be described.

The monitoring AP of this embodiment includes an Ethernet interface, a storage unit for storing identification information and signal strength of a neighboring AP, an RF module for storing strength of a WLAN signal received from another AP and identification information of the AP which has sent the signal, and a monitoring client for providing the information stored in the storage unit through the Ethernet interface in a wired manner.

The monitoring client may support analysis of data and generation of data based on an SNMP protocol, and the signal strength information of each AP stored in the storage unit may be stored in the form of MIB.

In addition, the monitoring client may provide the information stored in the storage unit only when an instruction requesting the signal strength information of a neighboring AP is received from a monitoring server, or may periodically provide the information stored in the storage unit to the monitoring server.

Heretofore, embodiments of the present disclosure have been described in detail with reference to the accompanying drawings. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An indoor position determination method based on WLAN (Wireless Local Area Network) signal strength, comprising:
    a remote monitoring step of collecting information about signal strength from a neighboring AP (Access Points) and generating an AP signal strength table;
    a position information requesting step of receiving identification information and signal strength of a detected AP from a mobile terminal; and
    a cell determination step of comparing a signal strength pattern of each AP received from the mobile terminal with a neighboring AP signal strength pattern of each AP with reference to the AP signal strength table and determining a cell having an AP with a most similar pattern as a cell where the mobile terminal is presently located,
    wherein in a case APs are arranged based on the received signal strength, the cell determination step performs the determination based on a similarity of AP sequences,
    wherein in the position information requesting step, in a case where identification information and signal strength of three or more APs are received from the mobile terminal, the method further comprises determining a detailed position of the mobile terminal in the cell, where the mobile terminal is determined as being located, by means of triangular surveying; and
    wherein the detailed position determining step includes calculating a distance from each AP to the mobile terminal in consideration of signal attenuation where at least one of a wall hop count and a floor hop count from each AP is reflected, when using the triangular surveying.

2. The indoor position determination method based on WLAN signal strength according to claim 1, wherein the remote monitoring step includes:
    sending an instruction, requesting information about signal strength from the neighboring AP, to each AP; and receiving a response signal including the information about signal strength from the neighboring AP as an answer to the instruction.

3. The indoor position determination method based on WLAN signal strength according to claim 2, wherein the instruction and the response signal is transmitted based on SNMP (Simple Network Management Protocol).

4. The indoor position determination method based on WLAN signal strength according to claim 3,
wherein the AP manages an AP profile in the form of MIB (Management Information Base) for each neighboring AP, and
wherein the AP profile includes identification information and signal strength value of the AP.

5. The indoor position determination method based on WLAN signal strength according to claim 1,
wherein the remote monitoring step includes receiving information about strength of the signal, sent by each AP, from the corresponding AP, and
wherein the detailed position determining step includes calculating a distance (d) from each AP to the mobile terminal by using the following equations:

$$PL(d) = PL(d_0) + 10n \times \log\left(\frac{d}{d_0}\right) + L(c)$$

$$L(c) = w \times WAF + f \times FAF + X_\sigma$$

where PL(d) represents strength of an AP signal received by the mobile terminal, $PL(d_0)$ represents strength of a signal of each AP, which is received by the corresponding AP, n represents a variable endowed depending on a characteristic of the space, $d_0$ represents a reference distance for signal measurement, d represents a distance from the AP to the mobile terminal, w represents a wall hop count from the AP to the mobile terminal, WAF represents a wall attenuation coefficient, f represents a floor hop count from the AP to the mobile terminal, FAF represents a floor attenuation coefficient, $X_\sigma$ represents a margin of error, and L(c) represents a random variable which means environmental.

6. The indoor position determination method based on WLAN signal strength according to claim 1,
wherein the cell determination step includes determining a cell where the mobile terminal is presently located, with reference to cell information data including information of APs installed in each cell, and
wherein the cell is set based on a space where the AP is installed so that there is no overlapping region among cells.

7. An indoor position determination method based on WLAN (Wireless Local Area Network) signal strength, comprising:
a remote monitoring step of collecting information about signal strength from a neighboring AP (Access Points) and generating an AP signal strength table;
a position information requesting step of receiving identification information and signal strength of a detected AP from a mobile terminal; and
a cell determination step of comparing a signal strength pattern of each AP received from the mobile terminal with a neighboring AP signal strength pattern of each AP with reference to the AP signal strength table and determining a cell having an AP with a most similar pattern as a cell where the mobile terminal is presently located,
wherein in the position information requesting step, in a case where identification information and signal strength of three or more APs are received from the mobile terminal,
wherein the method further comprises determining a detailed position of the mobile terminal in the cell, where the mobile terminal is determined as being located, by means of triangular surveying,
wherein the detailed position determining step includes calculating a distance from each AP to the mobile terminal in consideration of environmental attenuation from each AP to the mobile terminal, when using the triangular surveying, and
wherein the environmental attenuation from each AP to the mobile terminal employs environmental attenuation from each AP to an AP installed in the cell where the mobile terminal is located.

8. The indoor position determination method based on WLAN signal strength according to claim 7,
wherein the remote monitoring step includes receiving information about strength of a signal, sent by each AP, from the corresponding AP, and
wherein the detailed position determining step includes calculating a distance ($d_{i,m}$) from each AP to the mobile terminal by using the following equation:

$$d_{i,m} = d_0 10^{(Ld_{i,m}/10n)}$$

where $d_0$ represents a reference distance for signal measurement, n represents a variable endowed depending on a characteristic of the space, and $Ld_{i,m}$ represents distance attenuation from the $AP_i$ to the mobile terminal.

9. The indoor position determination method based on WLAN signal strength according to claim 8, wherein the $Ld_{i,m}$ is calculated by using the following equation:

$$Ld_{i,m} = PL(d) - PL(d_0) - L(c_{i,j})$$

where PL(d) represents strength of an AP signal received by the mobile terminal, $PL(d_0)$ represents strength of a signal of each AP, which is received by the corresponding AP, $L(c_{i,j})$ represents environmental attenuation of a signal path sent by the AP, and received by $AP_j$, and the $AP_j$ is an AP installed in the cell where the mobile terminal is located.

10. The indoor position determination method based on WLAN signal strength according to claim 9, wherein the $L(c_{i,j})$ is calculated by using the following equation:

$$L(c_{i,j}) = PL(d_{i,j}) - PL(d_0) - 10n \times \log\left(\frac{d_{i,j}}{d_0}\right)$$

where $PL(d_{i,j})$ represents strength of a signal sent from the AP, and received by the $AP_j$, which is obtainable from the AP signal strength table, and $d_{i,j}$ is an actual distance between the $AP_i$ and the $AP_j$, which is a previously stored value.

11. The indoor position determination method based on WLAN signal strength according to claim 10, wherein the n is calculated by using the following equation:

$$n = \frac{PL(d) - PL(d_0)}{10 \cdot \log(d/d_0)}$$

where the d is a distance between $AP_x$ and $AP_y$, which are installed in the same cell.

12. An indoor position determination system based on WLAN signal strength, comprising:
- a mobile terminal for sending identification information and signal strength of an AP whose signal is detected to a position determination service server to request position information;
- an AP for sending information about signal strength from a neighboring AP to the position determination service server;
- a position determination service server for collecting information received from the APs and generating an AP signal strength table, in a case the position information is requested by the mobile terminal, the position determination service server comparing a pattern of signal strength of each AP received from the mobile terminal with a pattern of signal strength of a neighboring AP of each AP with reference to the AP signal strength table, determining a cell having an AP with a most similar pattern as a cell where the mobile terminal is presently located, and sending information about the determined cell to the mobile terminal as position information;
- a space information storage unit for storing data about a location of an AP and a cell where the AP belongs to; and
- an AP information storage unit for storing the AP signal strength table,
- wherein in a case APs are arranged based on the respective signal strength, the determining a cell having an AP with a most similar pattern is performed based on a similarity of AP sequences,
- wherein in case of receiving information of three or more APs from the mobile terminal, the position determination service server further determines a detailed position of the mobile terminal in the cell, where the mobile terminal is determined as belonging to, by means of triangular surveying, and further provides the detailed position information to the mobile terminal, and
- wherein, when using the triangular surveying, the position determination service server calculates a distance from each AP to the mobile terminal in consideration of environmental attenuation from each AP to the mobile terminal, and the environmental attenuation from each AP to the mobile terminal employs environmental attenuation from each AP to an AP installed in the cell where the mobile terminal is located.

13. An AP for monitoring signal strength of neighboring APs, comprising:
- an Ethernet interface;
- a storage unit for storing identification information and signal strength of a neighboring AP;
- an RF module for storing strength of a WLAN signal received from another AP and identification information of the AP which has sent the signal; and
- a monitoring client for providing the information stored in the storage unit through the Ethernet interface in a wired manner and for comparing a signal strength pattern of each AP received from a mobile terminal with a neighboring AP signal strength pattern of each AP with reference to an AP signal strength table and determining a cell having an AP with a most similar pattern as a cell where the mobile terminal is presently located,
- wherein the signal strength information of each AP stored in the storage unit is stored in the form of Management Information Base (MIB),
- wherein in a case where identification information and signal strength of three or more APs are received from the mobile terminal, the monitoring client is configured for determining a detailed position of the mobile terminal in the cell, where the mobile terminal is determined as being located, by means of triangular surveying which includes calculating a distance from each AP to the mobile terminal in consideration of signal attenuation where at least one of a wall hop count and a floor hop count from each AP is reflected, when using the triangular surveying.

14. The AP for monitoring signal strength of neighboring APs according to claim 13,
- wherein the monitoring client supports analysis of data and generation of data based on an SNMP protocol.

15. The AP for monitoring signal strength of neighboring APs according to claim 13, wherein the monitoring client provides the information stored in the storage unit only when an instruction requesting the signal strength information of a neighboring AP is received from a monitoring server.

16. The AP for monitoring signal strength of neighboring APs according to claim 13, wherein the monitoring client periodically provides the information stored in the storage unit to a monitoring server.

17. An indoor position determination method based on WLAN (Wireless Local Area Network) signal strength, comprising:
- a remote monitoring step of collecting information about signal strength from a neighboring AP (Access Points) and generating an AP signal strength table;
- a position information requesting step of receiving identification information and signal strength of a detected AP from a mobile terminal; and
- a cell determination step of comparing a signal strength pattern of each AP received from the mobile terminal with a neighboring AP signal strength pattern of each AP with reference to the AP signal strength table and determining a cell having an AP with a most similar pattern as a cell where the mobile terminal is presently located,
- wherein in the position information requesting step, in a case where identification information and signal strength of three or more APs are received from the mobile terminal, the method further comprises determining a detailed position of the mobile terminal in the cell, where the mobile terminal is determined as being located, by means of triangular surveying; and
- wherein the detailed position determining step includes calculating a distance from each AP to the mobile terminal in consideration of signal attenuation where at least one of a wall hop count and a floor hop count from each AP is reflected, when using the triangular surveying.

18. An indoor position determination method based on WLAN (Wireless Local Area Network) signal strength, comprising:
- a remote monitoring step of collecting information about signal strength from a neighboring AP (Access Points) and generating an AP signal strength table;
- a position information requesting step of receiving identification information and signal strength of a detected AP from a mobile terminal; and
- a cell determination step of comparing a signal strength pattern of each AP received from the mobile terminal with a neighboring AP signal strength pattern of each AP with reference to the AP signal strength table and determining a cell having an AP with a most similar pattern as a cell where the mobile terminal is presently located,
- wherein in the position information requesting step, in a case where identification information and signal strength of three or more APs are received from the mobile terminal, the method further comprises determining a detailed position of the mobile terminal in the cell, where the mobile terminal is determined as being located, by means of triangular surveying; and wherein the detailed position determining step includes calculating a distance from each AP to the mobile terminal in consideration of environmental attenuation from each AP to the mobile terminal, when using the triangular surveying, and wherein the environmental attenuation from each AP to the mobile terminal employs environmental attenuation from each AP to an AP installed in the cell where the mobile terminal is located.

19. An indoor position determination system based on WLAN signal strength, comprising:

a mobile terminal for sending identification information and signal strength of an AP whose signal is detected to a position determination service server to request position information;

an AP for sending information about signal strength from a neighboring AP to the position determination service server;

a position determination service server for collecting information received from the APs and generating an AP signal strength table, in a case the position information is requested by the mobile terminal, the position determination service server comparing a pattern of signal strength of each AP received from the mobile terminal with a pattern of signal strength of a neighboring AP of each AP with reference to the AP signal strength table, determining a cell having an AP with a most similar pattern as a cell where the mobile terminal is presently located, and sending information about the determined cell to the mobile terminal as position information;

a space information storage unit for storing data about a location of an AP and a cell where the AP belongs to; and an AP information storage unit for storing the AP signal strength table, wherein in case of receiving information of three or more APs from the mobile terminal, the position determination service server further determines a detailed position of the mobile terminal in the cell, where the mobile terminal is determined as belonging to, by means of triangular surveying, and further provides the detailed position information to the mobile terminal, and wherein, when using the triangular surveying, the position determination service server calculates a distance from each AP to the mobile terminal in consideration of environmental attenuation from each AP to the mobile terminal, and the environmental attenuation from each AP to the mobile terminal employs environmental attenuation from each AP to an AP installed in the cell where the mobile terminal is located.

20. An indoor position determination system based on WLAN signal strength, comprising:

a mobile terminal for sending identification information and signal strength of an AP whose signal is detected to a position determination service server to request position information;

an AP for sending information about signal strength from a neighboring AP to the position determination service server;

a position determination service server for collecting information received from the APs and generating an AP signal strength table, in a case the position information is requested by the mobile terminal, the position determination service server comparing a pattern of signal strength of each AP received from the mobile terminal with a pattern of signal strength of a neighboring AP of each AP with reference to the AP signal strength table, determining a cell having an AP with a most similar pattern as a cell where the mobile terminal is presently located, and sending information about the determined cell to the mobile terminal as position information;

a space information storage unit for storing data about a location of an AP and a cell where the AP belongs to; and an AP information storage unit for storing the AP signal strength table, wherein in a case where identification information and signal strength of three or more APs are received from the mobile terminal, the position determination service server is further configured for determining a detailed position of the mobile terminal in the cell, where the mobile terminal is determined as being located, by means of triangular surveying; and wherein the detailed position determining includes calculating a distance from each AP to the mobile terminal in consideration of signal attenuation where at least one of a wall hop count and a floor hop count from each AP is reflected, when using the triangular surveying.

21. An indoor position determination system based on WLAN signal strength, comprising:

a mobile terminal for sending identification information and signal strength of an AP whose signal is detected to a position determination service server to request position information;

an AP for sending information about signal strength from a neighboring AP to the position determination service server;

a position determination service server for collecting information received from the APs and generating an AP signal strength table, in a case the position information is requested by the mobile terminal, the position determination service server comparing a pattern of signal strength of each AP received from the mobile terminal with a pattern of signal strength of a neighboring AP of each AP with reference to the AP signal strength table, determining a cell having an AP with a most similar pattern as a cell where the mobile terminal is presently located, and sending information about the determined cell to the mobile terminal as position information;

a space information storage unit for storing data about a location of an AP and a cell where the AP belongs to; and an AP information storage unit for storing the AP signal strength table, wherein in a case where identification information and signal strength of three or more APs are received from the mobile terminal, the position determination service server is further configured for determining a detailed position of the mobile terminal in the cell, where the mobile terminal is determined as being located, by means of triangular surveying; and wherein the detailed position determining includes calculating a distance from each AP to the mobile terminal in consideration of environmental attenuation from each AP to the mobile terminal, when using the triangular surveying, and wherein the environmental attenuation from each AP to the mobile terminal employs environmental attenuation from each AP to an AP installed in the cell where the mobile terminal is located.

* * * * *